US009088569B2

(12) United States Patent
Arroyo et al.

(10) Patent No.: US 9,088,569 B2
(45) Date of Patent: Jul. 21, 2015

(54) MANAGING ACCESS TO A SHARED RESOURCE USING CLIENT ACCESS CREDENTIALS

(75) Inventors: Jesse P. Arroyo, Rochester, MN (US); Ellen M. Bauman, Rochester, MN (US); Timothy R. Block, Rochester, MN (US); Leonardo Letourneaut, Rochester, MN (US); Timothy J. Schimke, Stewartville, MN (US)

(73) Assignee: International Business Machines Corporation, Armonk, NY (US)

( * ) Notice: Subject to any disclaimer, the term of this patent is extended or adjusted under 35 U.S.C. 154(b) by 897 days.

(21) Appl. No.: 13/105,985

(22) Filed: May 12, 2011

(65) Prior Publication Data

US 2014/0068734 A1    Mar. 6, 2014

(51) Int. Cl.
| | | |
|---|---|---|
| *H04L 29/06* | (2006.01) | |
| *G06F 9/455* | (2006.01) | |
| *G06F 21/62* | (2013.01) | |
| *G06F 9/52* | (2006.01) | |

(52) U.S. Cl.
CPC ............ *H04L 63/10* (2013.01); *G06F 9/45558* (2013.01); *G06F 9/52* (2013.01); *G06F 21/6209* (2013.01); *G06F 2221/2147* (2013.01)

(58) Field of Classification Search
CPC ..... G06F 9/00; G06F 11/00; G06F 2209/503; H04L 47/00
USPC .................................. 710/20, 200, 240–241
See application file for complete search history.

(56) References Cited

U.S. PATENT DOCUMENTS

| | | | |
|---|---|---|---|
| 4,393,459 A * | 7/1983 | Huntley et al. ................ 711/152 |
| 5,872,980 A * | 2/1999 | Derrick et al. ................ 710/200 |
| 7,010,607 B1 | 3/2006 | Bunton | |
| 7,275,121 B1 * | 9/2007 | Wong et al. .................... 710/240 |
| 7,487,284 B2 | 2/2009 | Kapur et al. | |
| 7,694,328 B2 | 4/2010 | Joshi et al. | |
| 7,702,835 B2 | 4/2010 | Riethmuller | |
| 2003/0217092 A1 * | 11/2003 | Veselov ......................... 709/106 |
| 2004/0139437 A1 * | 7/2004 | Arndt ............................ 718/100 |
| 2004/0215858 A1 * | 10/2004 | Armstrong et al. ........... 710/200 |
| 2006/0212607 A1 | 9/2006 | Riethmuller | |
| 2007/0169172 A1 * | 7/2007 | Backes et al. ...................... 726/2 |
| 2008/0025289 A1 | 1/2008 | Kapur et al. | |
| 2008/0126617 A1 * | 5/2008 | Brownlow et al. .............. 710/48 |
| 2010/0106697 A1 * | 4/2010 | Enoki et al. ................... 707/704 |

* cited by examiner

*Primary Examiner* — Andrew Nalven
*Assistant Examiner* — Mary Li
(74) *Attorney, Agent, or Firm* — Toler Law Group

(57) ABSTRACT

Systems and methods to manage access to shared resources are provided. A particular method may include receiving a request to access a shared resource from a first client of a plurality of clients and determining whether the shared resource is being used. A first window credential associated with the first client may be retrieved. The first window credential may be one of a plurality of window credentials associated with the plurality of clients. The first window credential may be used to access the shared resource.

16 Claims, 5 Drawing Sheets

MANAGING ACCESS TO A SHARED RESOURCE USING CLIENT ACCESS CREDENTIALS

I. STATEMENT OF GOVERNMENT RIGHTS

The disclosure was made with Government support under contract number HR0011-07-9-0002 awarded by the United States Department of Defense. The Government has certain rights in this disclosure.

II. FIELD OF THE DISCLOSURE

The present disclosure relates generally to computer memory architecture, and in particular, to a system and a method managing access to shared resources.

III. BACKGROUND

Computing architectures may share access to resources to increase utilization. For example, logical partitions may share memory and processing resources. Access by different requesting entities may be coordinated by programming protocols and techniques that attempt to reduce contention for the shared resources. Contention can interrupt work and cause processing delays. Conventional access techniques may introduce inherent delays and interference, while consuming power, space, and processing assets.

IV. SUMMARY OF THE DISCLOSURE

In a particular embodiment, a method of managing access to a shared resource may include receiving a request to access the shared resource from a first client of a plurality of clients and determining whether the shared resource is being used. A first window credential associated with the first client may be retrieved. The first window credential may be one of a plurality of window credentials associated with the plurality of clients. The first window credential may be used to access the shared resource.

In another embodiment, an apparatus may include a memory storing program code and a processor configured to access the memory and execute the program code configured to receive a request to access a shared resource. The program code may be executed to further determine that a first client of a plurality of clients is using the shared resource and to retrieve a first window credential associated with the first client. The first window credential may be one of a plurality of window credentials associated with the plurality of clients. The first window credential may be used to access the shared resource.

Another particular embodiment may include a program product that includes program code to receive a request to access a shared resource. The program code may be executed to further determine that a first client of a plurality of clients is using a shared resource and to retrieve a first window credential associated with the first client. The first window credential may be one of a plurality of window credentials associated with the plurality of clients. The first window credential may be used to access the shared resource. The program product may further include a non-transitory computer readable medium bearing the program code.

Software processes of various embodiments may reduce or eliminate interrupts, and task switching. Hypervisor processor usage may be limited. An embodiment may additionally reduce instances of jitter and the blocking of partition threads. An original requesting client may not have to callback within a specific time frame, or at all. An embodiment may further allow the hypervisor to provide proper isolation. The isolation may minimize instances where one partition negatively affects another partition. An embodiment may use relatively little hypervisor time for dispatching and may present less complexity with timer interactions.

Features and other benefits that characterize embodiments are set forth in the claims annexed hereto and forming a further part hereof. However, for a better understanding of embodiments, and of the advantages and objectives attained through their use, reference should be made to the Drawings and to the accompanying descriptive matter.

V. BRIEF DESCRIPTION OF THE DRAWINGS

VI. DETAILED DESCRIPTION

A particular embodiment may include a computing system configured to manage access to shared resources associated with an input/output (I/O) device. A hypervisor may use window credentials associated with client computing entities to access the shared resources on behalf of the client computing entities. As such, managing access may include facilitating a client's use of a shared resource, as well as preventing access to the resource, when appropriate. Illustrative client computing entities, or clients, may include logical partitions, as well as one or more virtualized subsets of a logical partition. As such, a logical partition may include multiple clients. The client may use the shared resource to perform work (e.g., hardware operations), and the hypervisor may monitor a status of the work.

Where a new client attempts to use a shared resource, the hypervisor may perform a check to determine if there is an active client. Should there be an active client using the shared resource, the hypervisor may use a window credential of the active client to determine if the resource has completed the work. A particular embodiment of a window credential may include a memory-mapped input/output (MMIO) address. The hypervisor may use the MMIO address to return a value from a resource (e.g., an I/O hub register) indicating a status of a hardware operation. The hardware device may have posted the value (e.g., an operational status of a hardware operation) within a register associated with the MMIO address. The hypervisor may thus access a window of resources on behalf of a requesting client, where the window may be directly inaccessible to the requesting client.

If the work has completed, the hypervisor may set a state for the active client and assign the shared resource to the new, requesting client. This process may enable the new client to access the shared resource. If the operation has alternatively not completed, the hypervisor may return to the new, requesting client with an indication that the resource is still in use. This feature may allow for the switching of the resource without extra context switches, interrupts, and timers. Associated processes may additionally reduce instances where user tasks are blocked, as well as reduce processor time in the hypervisor. In one respect, a particular embodiment may virtualize access of a common shared resource for clients with unique window credentials.

Figure 1:
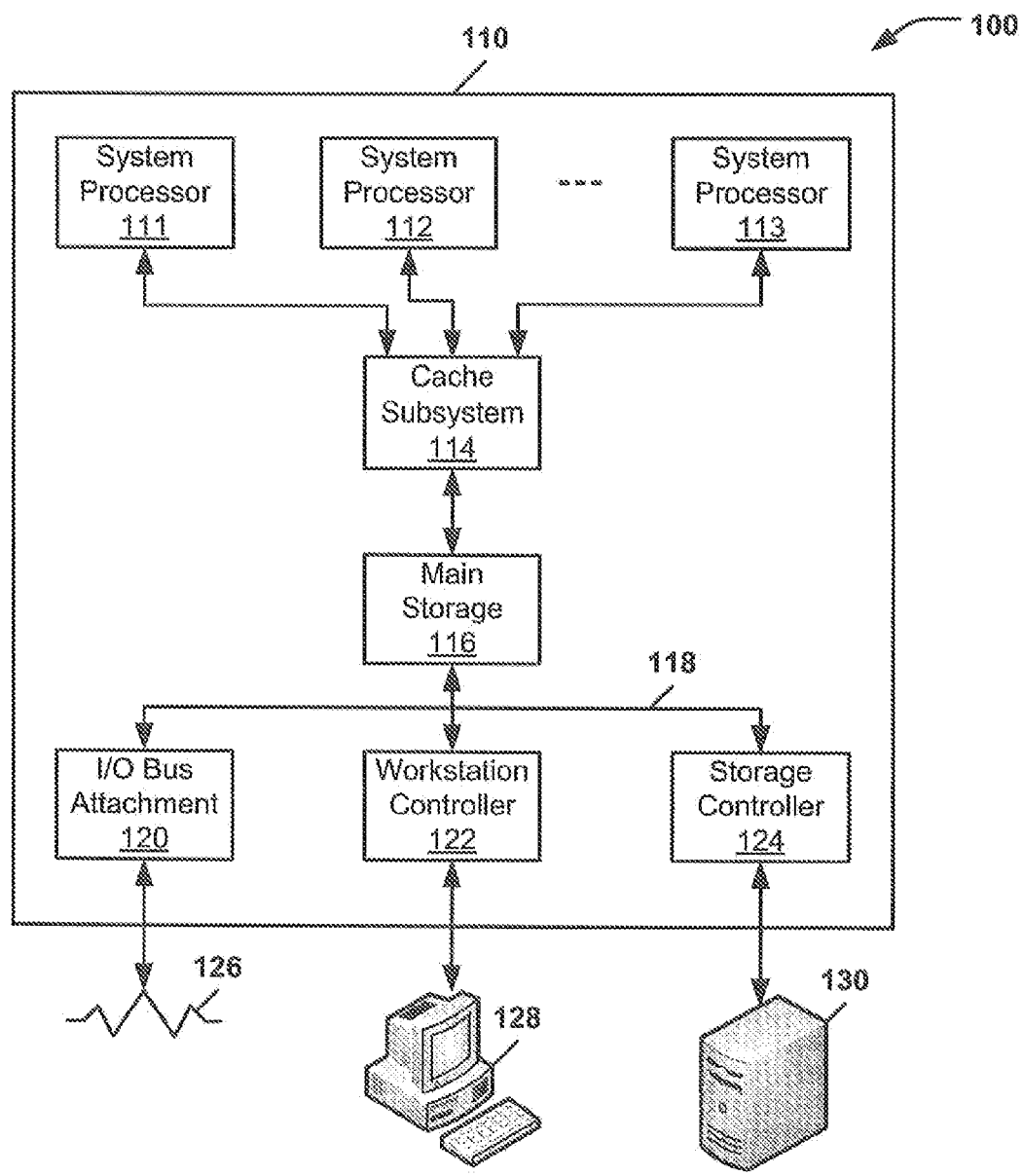
FIG. 1 is a block diagram of a computing system configured to manage access to shared resources of a logically partitioned computing system consistent with embodiments of the invention.

Turning more particularly to the drawings, FIG. 1 generally illustrates a data processing apparatus 100 consistent with an embodiment the invention. The apparatus 100, in specific embodiments, may include a computer, a computer system, a computing device, a server, a disk array, client computing entity, or other programmable device, such as a multi-user computer, a single-user computer, a handheld device, a networked device (including a computer in a cluster configuration), a mobile phone, a video game console (or other gaming system), etc. The apparatus 100 may be referred to as a logically partitioned computing system or computing system, but may be referred to as computer for the sake of brevity. One suitable implementation of the computer 110 may be a multi-user computer, such as a computer available from International Business Machines Corporation (IBM).

The computer 110 generally includes one or more physical processors 111, 112, 113 coupled to a memory subsystem including a main storage 116, e.g., an array of random access memory (RAM). The main storage 116 may include a dynamic random access memory (DRAM), a static random access memory (SRAM), a flash memory, a hard disk drive, and/or another digital storage medium. The processors 111, 112, 113 may be multithreaded and/or may have multiple cores. A cache subsystem 114 is illustrated as interposed between the processors 111, 112, 113 and the main storage 116. The cache subsystem 114 typically includes one or more levels of data, instruction and/or combination caches, with certain caches either serving individual processors or multiple processors.

The main storage 116 may be coupled to a number of external input/output (I/O) devices via a system bus 118 and a plurality of interface devices, e.g., an I/O bus attachment interface 120, a workstation controller 122, and/or a storage controller 124 that respectively provide external access to one or more external networks 126, one or more workstations 128, and/or one or more storage devices such as a direct access storage device (DASD) 130. The system bus 118 may also be coupled to a user input (not shown) operable by a user of the computer 110 to enter data (i.e., the user input sources may include a mouse, a keyboard, etc.) and a display (not shown) operable to display data from the computer 110 (i.e., the display may be a CRT monitor, an LCD display panel, etc.). The computer 110 may also be configured as a member of a distributed computing environment and communicate with other members of that distributed computing environment through a network 126.

Figure 2:
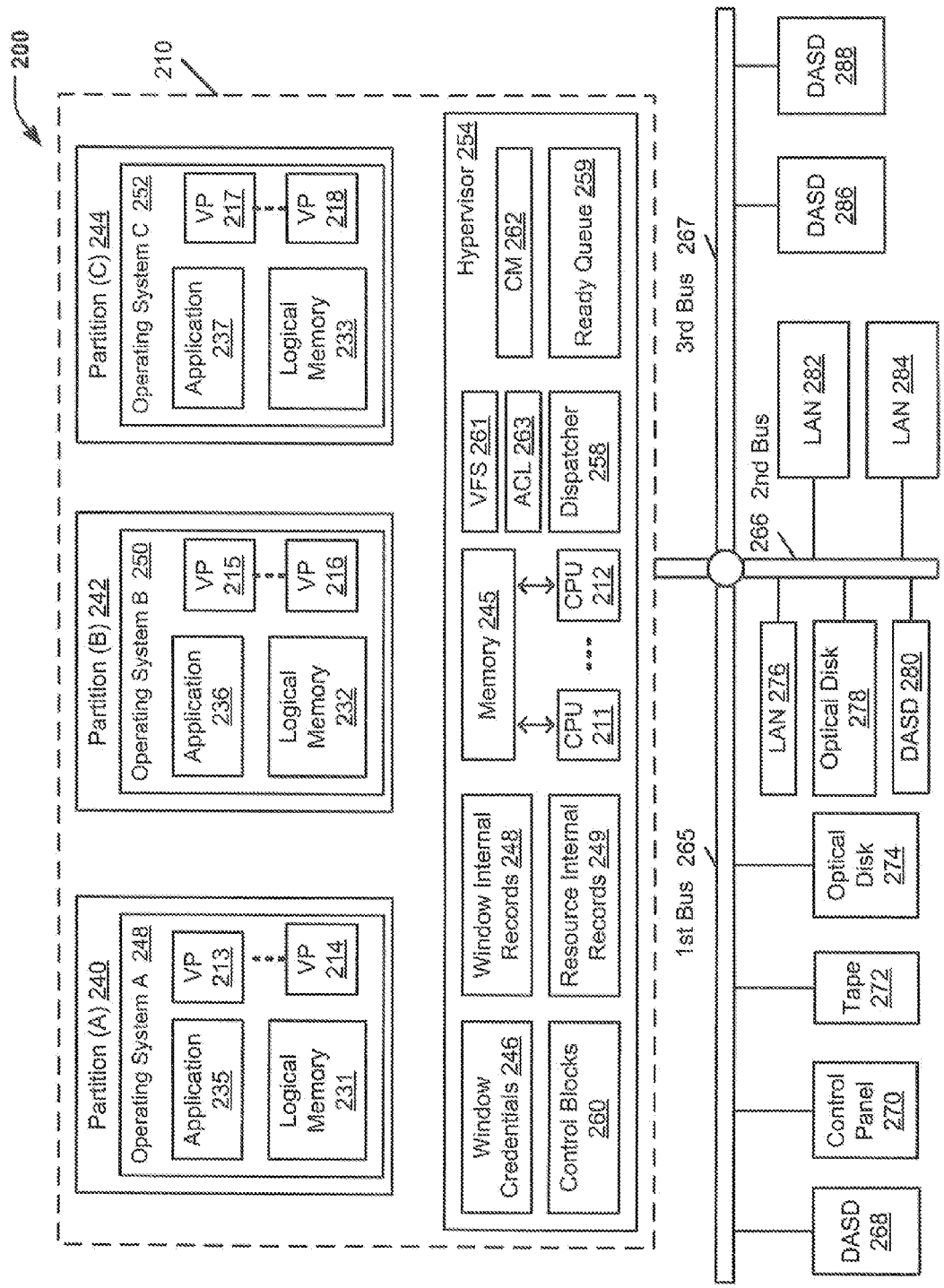
FIG. 2 is a block diagram of the primary software components and resources of the computing system of FIG. 1.

FIG. 2 illustrates in greater detail the primary software components and resources used to implement a logically partitioned environment consistent with a particular embodiment. FIG. 2 generally shows a logically partitioned computing system 200 having a computer 210 characterized as a virtual machine design, as developed by IBM. The computer 210 includes a plurality of partitions, e.g., partitions 240, 242 and 244, that share common processing resources. The logically partitioned computing system architecture may use a single computing machine having one or more processors 211, 212, or central processing units (CPU), coupled with a system memory 245. The system memory 245 may be incorporated into the cache subsystem 114, the main storage 116, or DASD 130 illustrated in FIG. 1, or into a separate memory. Referring back to FIG. 2, the processors 211, 212 may execute software configured to simulate one or more virtual processors (VPs) 213-218 in one or more logical partitions 240, 242, 244.

The logical partitions 240, 242, 244 may each include a portion of the processors 211, 212, the memory 245, and/or other resources of the computer 210. Each partition 240, 242, 244 typically hosts a respective operating environment, or operating system 248, 250, 252. After being configured with resources and the operating systems 248, 250, 252, each logical partition 240, 242, 244 generally operates as if it were a separate computer.

An underlying program, called a partition manager, a virtualization manager, or more commonly, a hypervisor 254, may be operable to assign and adjust resources to each partition 240, 242, 244. For instance, the hypervisor 254 may intercept requests for resources from the operating systems 248, 250, 252 or applications configured thereon in order to globally share and allocate the resources of computer 210. For example, when the partitions 240, 242, 244 within the computer 210 are sharing the processors 211, 212, the hypervisor 254 may allocate physical processor cycles between the virtual processors 213-218 of the partitions 240, 242, 244 sharing the processors 211, 212. The hypervisor 254 may also share other resources of the computer 210. Other resources of the computer 210 that may be shared include the memory 245, other components of the computer 210, other devices connected to the computer 210, and other devices in communication with computer 210. Although not shown, one having ordinary skill in the art will appreciate that the hypervisor 254 may include its own firmware and compatibility table. For purposes of this specification, a logical partition may use either or both the firmware of the partition 240, 242, 244, and hypervisor 254.

The hypervisor 254 may create, add, or adjust physical resources utilized by logical partitions 240, 242, 244 by adding or removing virtual resources from one or more of the logical partitions 240, 242, 244. For example, the hypervisor 254 controls the visibility of the physical processors 212 to each partition 240, 242, 244, aligning the visibility of the one or more virtual processors 213-218 to act as customized processors (i.e., the one or more virtual processors 213-218 may be configured with a different amount of resources than the physical processors 211, 212. Similarly, the hypervisor 254 may create, add, or adjust other virtual resources that align the visibility of other physical resources of computer 210.

Each operating system 248, 250, 252 controls the primary operations of its respective logical partition 240, 242, 244 in a manner similar to the operating system of a non-partitioned computer. For example, each logical partition 240, 242, 244 may be a member of the same, or a different, distributed computing environment. As illustrated in FIG. 2, the operating system 248, 250, 252 may include an application 235, 236, 237. In one embodiment, the application 235-237 is a middleware application that connects applications, processes, and/or software components. In the illustrated embodiment, the application 235-237 may consist of a set of enabling services that allow multiple processes running on one or more logical partitions of one or more computers to interact. As such, the application 235-237 may be a distributed application configured across multiple logical partitions (i.e., as shown in FIG. 2, across logical partitions 240, 242, 244) of one or more computers (i.e., as shown in FIG. 2, application is configured across computer 210) as part of a distributed computing environment. One such distributed computing environment is a WebSphere architecture, as developed by IBM, such that a business may set up, operate, and integrate network-based websites, applications, or businesses across one or more computing systems.

Each operating system 248, 250, 252 may execute in a separate memory space, represented by logical memories 231, 232, 233. For example and as discussed herein, each logical partition 240, 242, 244 may share the processors 211, 212 by sharing a percentage of processor resources as well as a portion of the available memory 245 for use in the logical memory 231-233. In this manner, the resources of a given processor 211, 212 may be utilized by more than one logical partition 240, 242, 244. In similar manners, the other resources available to computer 210 may be utilized by more than one logical partition 240, 242, 244.

The hypervisor 254 may include a dispatcher 258 that manages the dispatching of virtual resources to physical resources on a dispatch list, or a ready queue 259. The ready queue 259 comprises memory that includes a list of virtual resources having work that is waiting to be dispatched to a resource of computer 210. As shown in FIG. 2, the hypervisor 254 includes processors 211, 212 and processor control blocks 260. The processor control blocks 260 may interface with the ready queue 259 and comprise memory that includes a list of virtual processors 213-218 waiting for access on a respective processor 211, 212. Although FIG. 2 illustrates at least one processor control block 260 for each processor 211, 212, one skilled in the art will appreciate that the hypervisor 254 may be configured with more or less processor control blocks 260 than there are processors 211, 212.

To assist in coordinating or otherwise managing access to resources, the hypervisor 254 may include window credentials 246, window internal records 248, and resource internal records 249. Window credentials 246 may include data used to access a status of an operation at a hardware device. A particular embodiment of a window credential 246 may include an MMIO address. The hypervisor 254 may use the MMIO address to return a value from an I/O hub register indicating a status of a hardware operation. The hardware device may post the operational status of the hardware operation in a register associated with the MMIO address. For example, a value indicative of status may be mapped into processor memory space. More particularly, an I/O device may map values to a Peripheral Component Interconnect (PCI) bus or to an interconnect bus located between processors.

A window internal record 248 may include first status information maintained by the hypervisor 254 to indicate that status of an operation associated with a particular window credential 246. For example, the first status information may relate to work performed by a first client associated with a first, particular window credential. A resource internal record 249 may include second status information maintained by the hypervisor 254 to indicate that status of an operation associated with a particular resource. For example, the second status information may relate to work performed by a first client associated with a particular memory or processing resource. The resource internal record 249 may further indicate which client is currently using the shared resource.

The computer 210 may be configured with a virtual file system 261 to display a representation of the allocation of physical resources to the logical partitions 240, 242, 244. The virtual file system 261 may include a plurality of file entries associated with respective portion of physical resources of the computer 210 disposed in at least one directory associated with at least one logical partition 240, 242, 244. As such, the virtual file system 261 may display the file entries in the respective directories in a manner that corresponds to the allocation of resources to the logical partitions 240, 242, 244. Moreover, the virtual file system 261 may include at least one virtual file entry associated with a respective virtual resource of at least one logical partition 240, 242, 244. Advantageously, a user may interface with the virtual file system 261 to adjust the allocation of resources to the logical partitions 240, 242, 244 of the computer 210 by adjusting the allocation of the file entries among the directories of the virtual file system 261. As such, the computer 210 may include a configuration manager (CM) 262, such as a hardware management console, in communication with the virtual file system 261 and responsive to the interaction with the virtual file system 261 to allocate the physical resources of the computer 210. The configuration manager 262 may translate file system operations performed on the virtual file system 261 into partition management commands operable to be executed by the hypervisor 254 to adjust the allocation of resources of the computer 210.

Additional resources, e.g., mass storage, backup storage, user input, network connections, and the like, are typically allocated to the logical partitions 240, 242, 244 in a manner well known in the art. Resources can be allocated in a number of manners, e.g., on a bus-by-bus basis, or on a resource-by-resource basis, with multiple logical partitions 240, 242, 244 sharing resources on the same bus. Some resources may also be allocated to multiple logical partitions at a time. FIG. 2 illustrates, for example, three logical buses 265, 266, 267. The bus 265 is illustrated with a plurality of resources, including a DASD 268, a control panel 270, a tape drive 272, and an optical disk drive 274. All the resources may be allocated on a shared basis among logical partitions 240, 242, 244. Bus 266, on the other hand, may have resources allocated on a resource-by-resource basis, e.g., with a local area network (LAN) adapter 276, an optical disk drive 278, and a DASD 280 allocated to the logical partition 240, and LAN adapters 282 and 284 allocated to the logical partition 242. The bus 267 may represent, for example, a bus allocated specifically to logical partition 244, such that all resources on the bus, e.g., DASDs 286, 288 are allocated to the same logical partition.

Figure 3:
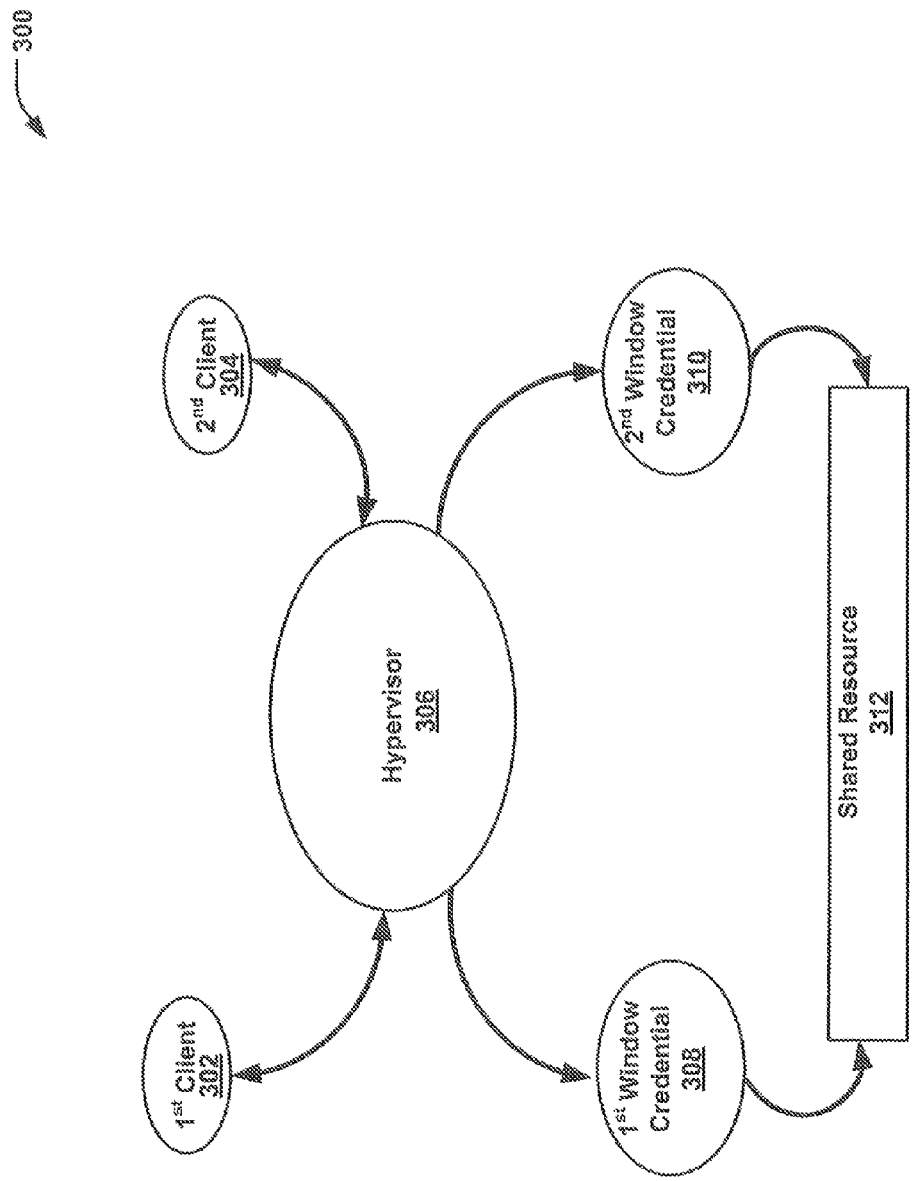
FIG. 3 is a diagram that logically represents processes and communications between software components and a resource of the computing system of FIG. 2.

FIG. 3 shows a diagram 300 that logically represents processing and communications between software components and resources of the computing system of FIG. 2. In one respect, FIG. 3 illustrates an embodiment of a system 300 where a hypervisor 306 may manage and perform hardware accesses on behalf of clients 302, 304. For example, the diagram depicts a hypervisor 306 operable to use a first access credential 308 of a first client 302 to access a shared resource 312 in response to a request from a second client 304. The shared resource 312 of an embodiment may include a collection of multiple resources of an I/O microchip that are grouped as a functions set (e.g., a window). The clients 302, 304 of the system 300 may include computing devices, such as logical partitions. In a particular embodiment, the clients 302, 304 may comprise a subset of a logical partition, such as an instance of an operating system or application. The clients 302, 304 may be coupled to or otherwise be in communication with the hypervisor 306. The hypervisor may use window credentials 308, 310 to access data pertaining to the shared resource 312.

In operation, the first client 302 may attempt to access the shared resource 312 using the first window credential 308. The attempt may be the first by one of the clients 302, 304 to access the shared resource 312. More particularly, the hypervisor 306 may receive a request from the first client 302 to access the shared resource 312. In response, the hypervisor 306 may attempt to access the shared resource 312 using the first window credential 308. In a particular embodiment, accessing the shared resource 312 may include accessing data pertaining to the shared resource 312. Accessing in another embodiment may include acquiring control of the shared resource 312.

The second client 304 may initiate a request to access the shared resource 312 using the second window credential 310. More particularly, the hypervisor 306 may receive a request to access the shared resource 312 from the second client 304. The hypervisor 306 may check the shared resource 312 in response and on behalf of the first client 302. That is, the hypervisor 306 may use the first window credential 308 to ascertain a status of the operation of the first client 302.

Where the operation of the first client 302 is done, the hypervisor 306 may set a window internal record associated with the first window 308 and/or first client 302 as being complete. The hypervisor 306 may then retrieve and use the second window credential 310 to access (e.g., retrieve status information pertaining to) the shared resource 312 on behalf of the second client 304.

In another scenario, the hypervisor 306 may communicate to the second client 304 that the first client 302 is active or otherwise using the shared resource 312. More particularly, the hypervisor 306 may use the first window credential 308 of the first client 302 to see if the shared resource 312 has completed the operation of the first client 302. If the shared resource 312 is still working on the operation of the first client 302, the hypervisor 306 may send a signal back to the second client 304. The signal may indicate that the shared resource 312 is busy, and that the second client 304 should try again (e.g., after some predetermined period or in response to a detected occurrence).

The hypervisor 306 may set a window internal record, such as the window internal record 248 of FIG. 2, to indicate that the work for the first client 302 is complete. The hypervisor 306 may maintain the work information because the first client 302 may eventually return to locate the work. The hypervisor 306 may further set an internal indication identifying the second client 304 as being the active client. In the embodiment of FIG. 2, the internal indication may be included within the resource internal record 249. The hypervisor 306 may further retrieve the second window credential (associated with the second client 304) and may access the shared resource 312.

Figure 4:
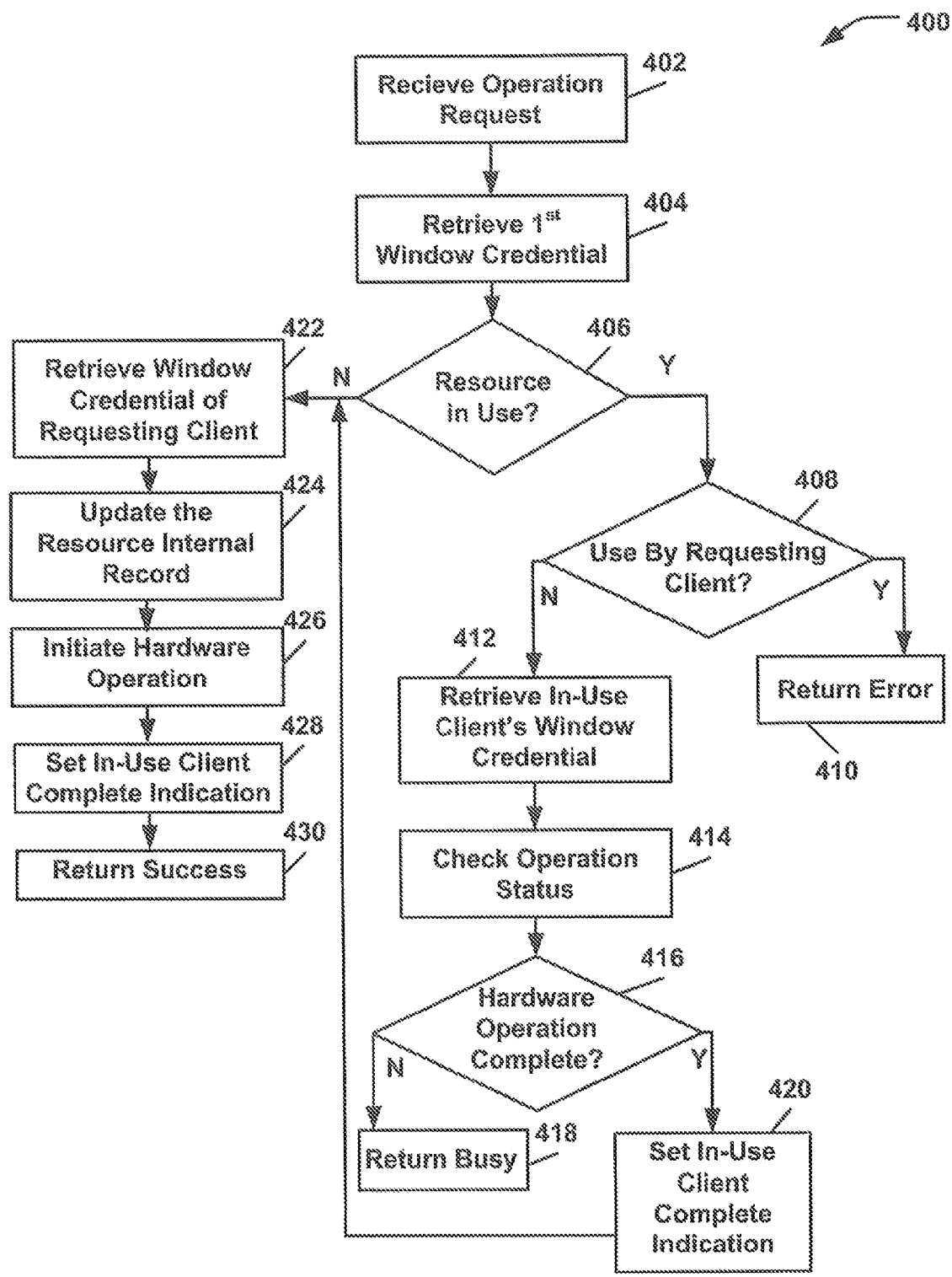
FIG. 4 is a flowchart of an embodiment of a first method of managing access to shared resources using the computing system of FIGS. 1-3.

FIG. 4 shows a flowchart of an embodiment of a first method 400 that includes processes that may be executed by the systems 100, 200, 300 of FIGS. 1-3 to manage access to a shared resource. The method 400 may be performed by a hypervisor to determine when a shared resource is available to clients requesting use of the shared resource. Turning more particularly to the flowchart, a hypervisor may receive at 402 an operation request from a first client. For instance, the hypervisor 306 of FIG. 3 may receive a hypervisor call from the first client 302 that requests access to the shared resource 312. The hypervisor may acquire a first window credential associated with the first client at 404. For example, the first client 302 of FIG. 3 may pass the first window credential 308 to the hypervisor 306.

At 406, the hypervisor may determine if the shared resource is in use. This determination may ensure that a current operation is not interrupted by a request for a new operation. In a particular embodiment, the hypervisor may check a resource internal record to see if the shared resource is currently in use. For example, the hypervisor 254 of FIG. 2 may check the resource internal record 249 to determine if a shared resource is currently being used. The resource internal record may further indicate which client is currently using the shared resource.

Where a shared resource is currently in use at 406, the hypervisor may determine at 408 if the shared resource is being used by the requesting client. For example, the hypervisor 306 of FIG. 3 may perform a check to ensure that the first client 302 is not both requesting and using the shared resource 312. Where the hypervisor determines that the shared resources is being used by the requesting client, then the hypervisor may return at 410 an error to the requesting client or to an administrator.

Alternatively at 412, the hypervisor may retrieve the client window credential(s) of the in-use client. That is, the hypervisor may retrieve the client window credential of the client that is currently using the shared resource, e.g., as indicated by the resource internal record.

The hypervisor may use the retrieved, in-use client window credential at 414 to check a status of the hardware operation. In a particular embodiment, a window credential may include an MMIO address. The hypervisor may use the MMIO address to return a value from an I/O hub register indicating a status of the hardware operation. The hardware device may post the operational status of the hardware operation in a register associated with the MMIO address.

The hypervisor may determine at 416 if the hardware operation is complete. For example, the hypervisor may evaluate the value retrieved from the hardware register using the in-use client window credential. Where the hardware operation is determined to be incomplete, the hypervisor may initiate a busy indication at 418 that is communicated to the requesting client.

Where the hypervisor alternatively determines at 416 that the hardware operation is complete, then the hypervisor may set at 420 the in-use client completion indication in the window internal record within hypervisor memory. For instance, hypervisor 254 of FIG. 2 may set an in-use client completion indication in the window internal record 248. This completion indication may indicate that the last hardware operation is complete. The completion indication within the window internal record may function to make the shared resource available to a second client. The second client may be otherwise unaware that the first client was using the shared resource.

The hypervisor may retrieve at 422 the window credential of the requesting client. For example, the hypervisor 306 of FIG. 3 may acquire the second window credential 310 associated with the second client 304. The hypervisor may update at 424 the resource internal record to indicate that the requesting client is now the in-use active client. For instance, hypervisor 254 of FIG. 2 may update the window internal record 249 to indicate which entity is currently using the shared resource.

The hypervisor may initiate the hardware operation at 426 using the window credential. At 428, the hypervisor may set the in-use client complete indication as being false for the window internal record associated with the requesting, or new client. This internal record indication may be used to notify the hypervisor that the current hardware operation is still ongoing. One such scenario may include where the hypervisor subsequently checks the status of the hardware operation on behalf of another requesting client.

The hypervisor may return a success indication signal at 430 to the requesting client. The success indication may communicate to the requesting client that the requesting operation has been initiated.

Figure 5:
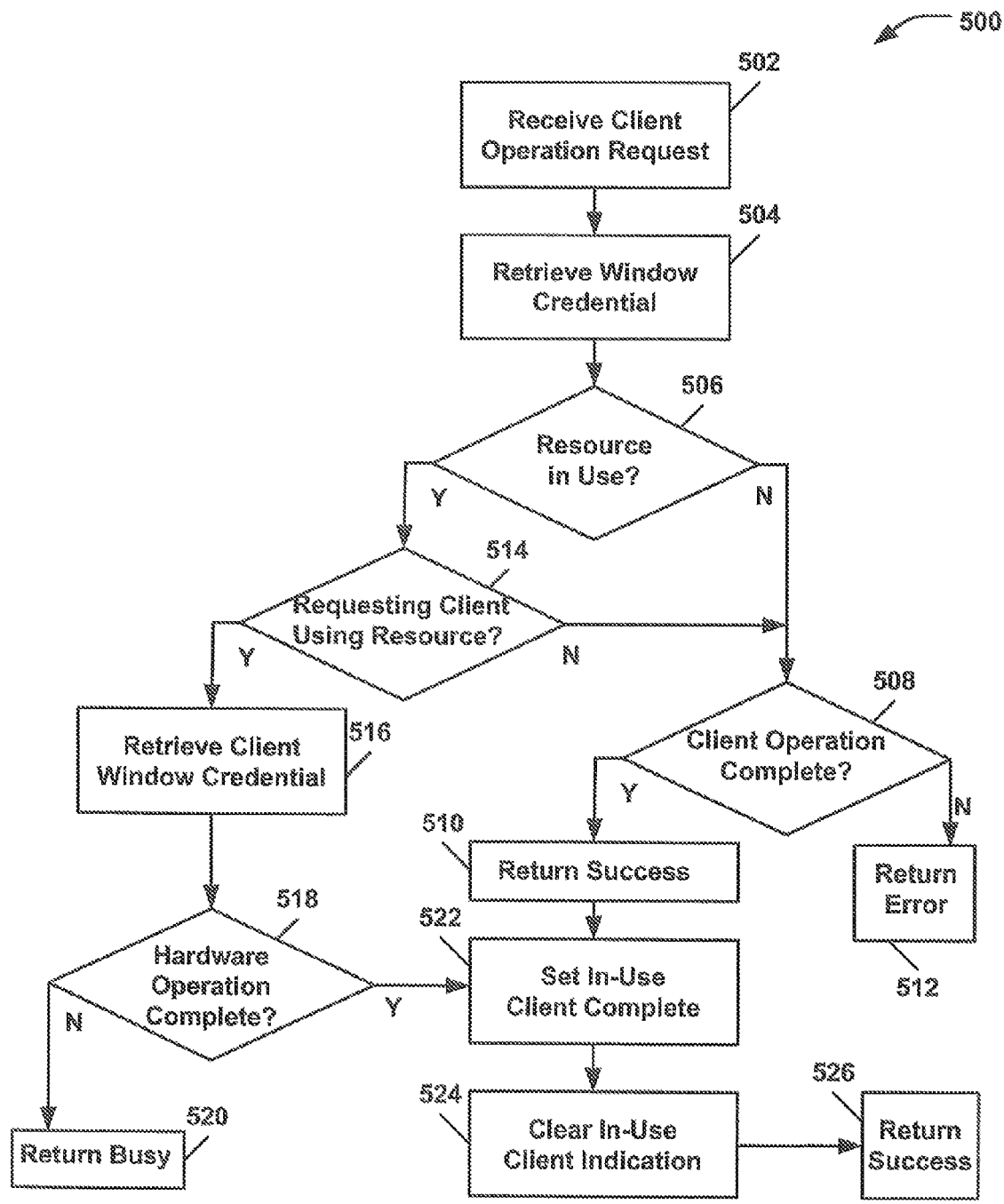
FIG. 5 is a flowchart of an embodiment of a second method of managing access to shared resources using the computing system of FIGS. 1-3.

FIG. 5 shows a flowchart of an embodiment of a second method 500 that includes processes executable by the systems 100, 200, 300 of FIGS. 1-3 to manage access to a shared resource. More particularly, a client operation request may be initiated and received at 502. For example, the hypervisor 306 of FIG. 3 may receive a client operation request from a first client 302. Window credentials may be passed and received at the hypervisor at 504. For instance, the hypervisor 306 of FIG. 3 may receive the first window credential 308 from the first client 302.

The hypervisor may check at 506 to see if the shared resource is in use. For instance, the hypervisor may check the resource internal record to determine if a client is currently using the shared resource. Where no client is using the shared resource according to the resource internal record at 506, the hypervisor may determine at 508 if the requesting client operation is complete. For example, the hypervisor may check the window internal record specific to the window used by the requesting client.

Where the requesting client operation is determined to be complete at 508, the hypervisor may return an indication of success at 510. The indication of success may notify the requesting client that the previously requested operation has been successfully completed. Alternatively, where the requesting client operation is incomplete at 508, the hypervisor may return an error at 512. For example, an error may be determined when a client is checking for an operation that it never initiated.

Where the resource is alternatively determined to be in use at 506, the hypervisor may determine at 514 if the requesting client is the entity that is currently using the shared resource. For example, the hypervisor may check the shared resource internal record to see which client is using an I/O microchip resource. Where the shared resource is not currently being used by the requesting client, the hypervisor may determine at 508 if the current hardware operation is complete for the client that is accessing the shared resource. To this end, the hypervisor may check the window internal record associated with the client indicated by the shared resource internal record at 514.

Where the resource is determined as being used by the requesting client, the hypervisor may retrieve at 516 the in-use client window credentials. Having the particular window credential(s) may ensure that the correct information to be returned.

At 518, the hypervisor may check to see if the hardware operation is complete. For example, the hypervisor may use a window credential (e.g., an MMIO address) to return a value from the I/O hub register indicating a status of the hardware operation. Where the hardware operation is incomplete at 518, the hypervisor may return a busy signal at 520 to the requesting client. The busy indication signal may inform the client that the shared resource is currently in use. The client may automatically initiate another checking process at a later time.

Where the hardware operation is determined to be complete at 518, the hypervisor at 522 may set the in-use client complete indication for the window internal record. The hypervisor at 524 may clear the in-use client. This process at 524 may update the shared resource internal record to indicate that no client is currently using the shared resource. The hypervisor may return a success indication signal at 526 to the client indicating that the operation has finished.

As discussed herein, clients may share access to commonly shared resources. For example, an I/O hardware device may support a number of hardware resources that are shared across all clients using that I/O device. Each of the resources may perform a function. The duration of the function may vary and otherwise be unknown to the clients. As such, a client may poll to determine if an operation has been completed. An illustrative I/O device may include 256 communication channels, or windows.

A window may be similar to a network socket or an Infiniband Queue Pair, and may include an active job. Furthermore, the window credentials may each be assigned to different clients (e.g., logical partitions). Each window credential may have a protected access range and address space that is unique. In a particular embodiment, a window credential may include a dynamic nature. That is, a window credential may be allocated, re-allocated, or deleted depending on the originating process, operating system, and additional factors, e.g., hypervisor paging algorithms, etc. An issued window credential has to be revoked as soon as the process or thread of the client has ended or has been terminated. The unique address space may allow the hardware to distinguish between clients and provide isolation. The hardware for the shared resources may provide a view to the resource for each window credential. The view may only indicate if the window has a hardware operation in progress and may not provide arbitration between windows, or the ability to see if the shared resource is available. Client jobs may require access to the shared hardware resources. The hypervisor may provide access to the resources while reducing contention and preventing covert channel communication.

Resources sharing operations may include adapters and other I/O devices. Attempts to provide a larger number of resources may include larger amounts of silicon real estate space and may lead to higher microchip costs, as well as higher power consumption.

In some instances, hardware may generate and interrupt upon the completion of an operation. The interrupt may allow a hypervisor to mark an operation as complete and may allow other clients to proceed without the original client. This process may involve both additional hardware costs and will cause interrupts to the hypervisor that may lead to additional context switches and task dispatches. These processes may consume processing resources. Additionally, allowing a hypervisor to remain in the context of a partition until a shared resources has completed its operation may lead to long delays and may introduce jitter or interference.

Allowing an operation to start within a hypervisor call, returning from the call, and waiting for a client to make another hypervisor call to check the completion of the operation may block other partitions from using a shared resource until the originating client has performed the checking call. Clients may not be insulated from each other and resources may be unavailable to other clients well after a hardware operation has completed. Embodiments may provide managed access to shared resources in a manner that address the above considerations.

Particular embodiments described herein may take the form of an entirely hardware embodiment, an entirely software embodiment or an embodiment containing both hardware and software elements. In a particular embodiment, the disclosed methods are implemented in software that is embedded in processor readable storage medium and executed by a processor, which includes but is not limited to firmware, resident software, microcode, etc.

Further, embodiments of the present disclosure, such as the one or more embodiments may take the form of a computer program product accessible from a computer-usable or computer-readable storage medium providing program code for use by or in connection with a computer or any instruction execution system. For the purposes of this description, a non-transitory computer-usable or computer-readable storage medium can be any apparatus that can tangibly embody a computer program and that can contain, store, communicate, propagate, or transport the program for use by or in connection with the instruction execution system, apparatus, or device.

In various embodiments, the medium can include an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and digital versatile disk (DVD).

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the data processing system either directly or through intervening I/O controllers. Network adapters may also be coupled to the data processing system to enable the data processing system to become coupled to other data processing systems or remote printers or storage devices through intervening private or public networks. Modems, cable modems, and Ethernet cards are just a few of the currently available types of network adapters.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. For example, an embodiment may include multiple processors connected to a single memory controller, either using separate processor busses from each processor to the memory controller, or using a single shared system bus that is connected to all processors and the memory controller. Thus, the present disclosure is not intended to be limited to the embodiments shown herein but is to be accorded the widest scope possible consistent with the principles and features as defined by the following claims.

The invention claimed is:

1. A computer implemented method of managing access to a shared resource, the method comprising:
   receiving, at a hypervisor, a first request to access a shared resource from a first client of a plurality of clients;
   responsive to the first request from the first client, using, at the hypervisor, a first window credential associated with the first client to access the shared resource on behalf of the first client, wherein the first window credential is one of a plurality of window credentials associated with the plurality of clients, wherein the first window credential includes data used to access a status value of a hardware operation associated with the shared resource, wherein the status value is stored in a register of the shared resource, and wherein the register is inaccessible to the plurality of clients;
   receiving, at the hypervisor, a second request to access the shared resource from a second client of the plurality of clients; and
   responsive to the second request from the second client, using, at the hypervisor, the first window credential to access the register on behalf of the second client to determine the status value of the hardware operation associated with the shared resource.

2. The method of claim 1, further comprising using, at the hypervisor, a second window credential associated with the second client to access the shared resource on behalf of the second client in response to determining that the status value indicates that the hardware operation associated with the shared resource is complete.

3. The method of claim 2, further comprising:
   receiving, at the hypervisor, a third request to access the shared resource from a particular client of the plurality of clients; and
   responsive to the third request, using, at the hypervisor, the second window credential associated with the second client to access the register on behalf of the particular client to determine a second status value of a second hardware operation associated with the shared resource.

4. The method of claim 3, wherein the third request is received at the hypervisor from the first client.

5. The method of claim 3, wherein the third request is received at the hypervisor from a third client of the plurality of clients, wherein a third window credential is associated with the third client.

6. The method of claim 1, further comprising updating a resource internal record to identify the first client as having access to the shared resource, wherein the resource internal record is maintained by the hypervisor.

7. The method of claim 1, further comprising updating, at the hypervisor, a window internal record associated with the first window credential, wherein the window internal record is maintained by the hypervisor.

8. An apparatus comprising:
   a memory storing program code; and
   a processor configured to access the memory and execute the program code to:
      receive, at a hypervisor, a first request to access a shared resource from a first client of a plurality of clients;
      responsive to the first request from the first client, use, at the hypervisor, a first window credential associated with the first client to access the shared resource on behalf of the first client, wherein the first window credential is one of a plurality of window credentials associated with the plurality of clients, wherein the first window credential includes data used to access a status value of a hardware operation associated with the shared resource, wherein the status value is stored in a register of the shared resource, and wherein the register is inaccessible to the plurality of clients;
      receive, at the hypervisor, a second request to access the shared resource from a articular client of the s luralit of clients; and
      responsive to the second request from the particular client, use, at the hypervisor, the first window credential to access the register on behalf of the particular client to determine the status value of the hardware operation associated with the shared resource.

9. The apparatus of claim 8, wherein the data comprises a memory-mapped input/output address associated with the register of the shared resource.

10. The apparatus of claim 8, wherein the second request is received at the hypervisor from a second client of the plurality of clients, and wherein a second window credential is associated with the second client.

11. The apparatus of claim 10, further comprising using, at the hypervisor, the second window credential associated with the second client to access the shared resource on behalf of the second client in response to determining that the status value indicates that the hardware operation associated with the shared resource is complete.

12. The apparatus of claim 11, further comprising:
receiving, at the hypervisor, a third request to access the shared resource from a third client of the plurality of clients; and
responsive to the third request, using, at the hypervisor, the second window credential associated with the second client to access the register on behalf of the third client to determine a second status value of a second hardware operation associated with the shared resource.

13. A program product, comprising:
program code to:
receive, at a hypervisor, a first request to access a shared resource from a first client of a plurality of clients;
responsive to the first request from the first client, use, at the hypervisor, a first window credential associated with the first client to access the shared resource on behalf of the first client, wherein the first window credential is one of a plurality of window credentials associated with the plurality of clients, wherein the first window credential includes data used to access a status value of a hardware operation associated with the shared resource, wherein the status value is stored in a register of the shared resource, and wherein the register is inaccessible to the plurality of clients;
receive, at the hypervisor, a second request to access the shared resource from a particular client of the plurality of clients; and
responsive to the second request from the particular client, use, at the hypervisor, the first window credential to access the register on behalf of the particular client to determine the status value of the hardware operation associated with the shared resource; and
a non-transitory computer readable medium storing the program code.

14. The method of claim 1, wherein the data comprises a memory-mapped input/output address associated with the register of the shared resource.

15. The method of claim 1, further comprising determining, at the hypervisor, whether the shared resource is being used by checking a resource internal record to determine if the shared resource is in use, wherein the resource internal record is maintained by the hypervisor, and wherein the resource internal record identifies a particular client of the plurality of clients that is using the shared resource.

16. The method of claim 1, wherein the first window credential is allocated, re-allocated, deleted, or any combination thereof, based on at least one of an originating process, an operating system, or a paging process of the hypervisor.

\* \* \* \* \*